United States Patent [19]

Speca

[11] Patent Number: 4,513,095

[45] Date of Patent: Apr. 23, 1985

[54] INTERMETALLIC COMPOUNDS OF POLYMERIC TRANSITION METAL OXIDE ALKOXIDES AND CATALYTIC USE THEREOF

[75] Inventor: Anthony N. Speca, Cincinnati, Ohio

[73] Assignee: National Distillers and Chemical Corporation, New York, N.Y.

[21] Appl. No.: 483,054

[22] Filed: Apr. 7, 1983

Related U.S. Application Data

[63] Continuation-in-part of Ser. No. 209,223, Nov. 24, 1980, abandoned, Ser. No. 209,224, Nov. 24, 1980, abandoned, Ser. No. 209,225, Nov. 24, 1980, abandoned, Ser. No. 209,226, Nov. 24, 1980, abandoned, Ser. No. 209,227, Nov. 24, 1980, abandoned, Ser. No. 209,228, Nov. 24, 1980, abandoned, Ser. No. 209,229, Nov. 24, 1980, abandoned, and Ser. No. 228,831, Jan. 27, 1981, abandoned.

[51] Int. Cl.$^3$ .............................................. C08F 4/64
[52] U.S. Cl. .................................... 502/111; 502/103; 502/104; 502/113; 502/115; 502/117; 502/119; 502/129; 502/132; 502/133; 502/134; 502/171; 526/124; 526/125; 526/126; 526/128; 526/133; 526/155; 526/172
[58] Field of Search ............... 502/111, 104, 115, 103, 502/133, 171, 119, 134, 132, 113, 117, 129

[56] References Cited

U.S. PATENT DOCUMENTS

| | | | |
|---|---|---|---|
| 2,663,720 | 12/1983 | Hill | 260/429 |
| 2,689,858 | 9/1954 | Boyd | 260/429 |
| 2,720,502 | 10/1955 | Caldwell | 260/75 |
| 2,899,418 | 8/1959 | Reynolds | 260/94.9 |
| 2,930,785 | 3/1960 | Edmonds, Jr. | 260/94.9 |
| 2,943,066 | 6/1960 | Arnold et al. | 502/349 X |
| 3,113,986 | 12/1963 | Breslow et al. | 502/103 X |
| 3,177,194 | 4/1965 | Stampa | 502/111 X |
| 3,309,349 | 3/1967 | Greenberg | 260/94.9 |
| 3,365,434 | 1/1968 | Coover et al. | 260/93.7 |
| 3,458,552 | 7/1969 | Hsack et al. | 260/448 |
| 3,644,318 | 2/1972 | Diedrich et al. | 252/429 C X |
| 3,803,105 | 4/1974 | Galli et al. | 502/107 X |
| 3,839,313 | 10/1974 | Galli et al. | 502/133 X |
| 3,901,863 | 8/1975 | Berger et al. | 260/88.2 R |
| 3,998,996 | 12/1976 | Toth | 502/104 X |
| 4,105,585 | 8/1978 | Matheson | 502/111 |
| 4,174,299 | 11/1979 | Giannini et al. | 502/119 |
| 4,194,992 | 3/1980 | Corbellini et al. | 252/442 |
| 4,198,315 | 4/1980 | Birkelbach | 502/113 |
| 4,245,071 | 1/1981 | Kondo et al. | 252/429 B X |
| 4,292,200 | 9/1981 | Berger et al. | 252/431 C |
| 4,312,968 | 1/1982 | Dietz | 526/125 |
| 4,317,897 | 3/1982 | Herrmann et al. | 252/429 C |

FOREIGN PATENT DOCUMENTS

| | | |
|---|---|---|
| 1259962 | 1/1972 | United Kingdom . |
| 1276345 | 6/1972 | United Kingdom . |
| 1295743 | 11/1972 | United Kingdom . |
| 1357474 | 6/1974 | United Kingdom . |
| 1464451 | 2/1977 | United Kingdom . |
| 2046740 | 11/1980 | United Kingdom . |

OTHER PUBLICATIONS

Isao Shiibara, et al., The Organic Chemistry of Titanium, (1961), *Chem. Rev.* 61.
A. N. Nesmeyanov, et al., "Trialkoxytitaniums and Dialkoxytitanoxides" (1954) *Doklady Akademii Nauk SSSR*.
D. C. Bradley, et al., "Metal Alkoxides", (1978), pp. 12, 84.

*Primary Examiner*—Patrick Garvin
*Attorney, Agent, or Firm*—Kenneth D. Tremain

[57] ABSTRACT

Polymeric transition metal oxide alkoxides are converted by reaction with a reducing metal having a higher oxidation potential then the transition metal to a catalyst precursor, activated with a halide to form a catalyst component for olefin polymerization. Particularly exemplified are the reaction products of partially hydrolyzed titanium alkoxides with Mg°, used as a catalyst component for slurry polymerizations to produce polyethylene resins.

32 Claims, No Drawings

INTERMETALLIC COMPOUNDS OF POLYMERIC TRANSITION METAL OXIDE ALKOXIDES AND CATALYTIC USE THEREOF

CROSS REFERENCE TO RELATED APPLICATIONS

This application is a continuation-in-part of copending commonly assigned applications of the same inventive entity as follows: Ser. Nos. 209,223; 209,224; 209,225; 209,226; 209,227; 209,228; 209,229, all filed Nov. 24, 1980; and Ser. No. 228,831, filed Jan. 27, 1981 all of which are now abandoned.

BACKGROUND OF THE INVENTION

This invention relates to intermetallic compounds of transition metal oxide alkoxides and processes for their production. More particularly, the invention affords catalyst precursors for interreaction with halide activators to provide a catalyst component adapted for the polymerization of alpha olefins.

Polyethylene, produced by solution or slurry processes at lower pressures providing a linear high density resin, or in autoclave or tubular reactors at higher pressures, providing a long chain branched low density resin, has been an object of commercial production for many years.

It has been recognized that certain characteristics of the linear high density resins such as stiffness and abrasion resistance would usefully be combined with valuable properties of the branched low density resin such as high impact toughness and stress crack resistance, and it has been discovered that the interrelationship of these properties may be attributed in part to the nature and amount of side chain development.

Accordingly, linear low density polyethylene resins have now been produced in low pressure processes employing specialized catalyst systems, the resins being characterized by linearity and short chain branching afforded by alkene comonomers (without significant long chain branching), and offering narrow molecular weight distribution, improved strength properties, higher melt viscosity, high softening point, improved ESCR (Environmental Stress Crack Resistance) and improved low temperature brittleness. These and related properties provide advantages to the user in such applications as blown film, wire and cable coating, cast film, coextrusion, and injection and rotational molding.

It is an objective to manufacture such linear low density resins in an economic and efficient manner under the conditions existing in slurry reactors, and to accomplish such manufacture with the provision of resin of competitive product characteristics, employing catalyst systems having user acceptable residues.

The linear olefin polymers have typically been produced using coordination catalysts of the general type disclosed by Ziegler, thus comprising a transition metal compound, usually a titanium halide admixed with an organometallic compound such as alkyl aluminum. The transition metal component may be activated by reaction with a halide promoter such as an alkyl aluminum halide. Among the improved catalysts of this type are those incorporating a magnesium component, usually by interaction of magnesium or a compound thereof with the transition metal component or the organometallic compounds, as by milling or chemical reaction or association.

It is a further object to provide a catalyst for the polymerization of alpha olefins affording a range of resin properties under various synthesis conditions.

A particular object is the preparation of linear low density polyethylene having a broadened molecular weight distribution.

BRIEF DESCRIPTION OF THE INVENTION

According to the present invention, transition metal-containing intermetallic compounds are prepared by the reaction of a transition metal oxide alkoxide with at least one reducing metal, i.e., a metal having a higher oxidation potential than the transition metal. Thus, a polymeric titanium alkoxide, or oxoalkoxide, is reacted with magnesium metal to provide a reaction product which may be activated to form an olefin polymerization catalyst element.

The polymeric transition metal alkoxide may be separately prepared by the controlled hydrolysis of the alkoxide; or the polymeric alkoxide or oxoalkoxide may be provided by an in situ reaction, e.g., hydrolysis in a reaction medium including the reducing metal. For example, titanium tetrabutoxide may be reacted with magnesium metal in a hydrocarbon solvent, and in the presence of a controlled source of water, preferably a hydrated metal salt such as magnesium halide hexahydrate.

Transition metal alkoxides, particularly titanium alkoxides, are known for their colligative properties in organic solvents, and their sensitivity to hydrolysis: see, for example, "The Polymeric Nature of Titanium Tetraethoxide in Solution", Bradley, et al. *Inorg. Chem.*, Vol. 3, No. 8 pp. 1163–65 (1969).

It is reported that the hydrolysis reaction proceeding from the oligomeric, usually trimeric titanium alkoxides results in polymeric titanium oxide alkoxides, according to the following representative general formula:

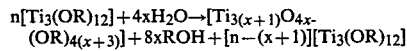

$n[Ti_3(OR)_{12}] + 4xH_2O \rightarrow [Ti_{3(x+1)}O_{4x}(OR)_{4(x+3)}] + 8xROH + [n-(x+1)][Ti_3(OR)_{12}]$

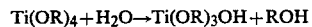

$Ti(OR)_4 + H_2O \rightarrow Ti(OR)_3OH + ROH$

$Ti(OR)_3OH \rightarrow Ti(OR)_3OTi(OR)_3 + H_2O$ even more generally expressed as

$Ti(OR)_4 + nH_2O \rightarrow TiO_n(OR)_{4-2n} + 2nROH$

Condensation reactions may also occur especially at elevated temperatures to structures involving primary metal-oxygen-metal bridges such as:

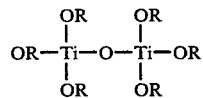

which may in turn participate in or constitute precursors for hydrolysis reactions-See Bradley, et al. *Metal Alkoxides* Academic Press (New York 1978) especially pages 150–167 and references cited therein, in particular G. Winter *Oil and Colour Chemists Association*, 34 pp. 30–35 (January 1951); D. C. Bradley, *Coor. Chem., Rev.*, 2 pp. 299–318 (1967).

These polymeric titanium alkoxides or oxoalkoxides (sometimes also referred to as μ-oxoalkoxides) may be represented by the series $[Ti_{3(x+1)}O_{4x}(OR)_{4(x+3)}]$ where X=0,1,2,3, ..., the structure reflecting the tendency of the metal to expand its coordination beyond its primary valency coupled with the ability of the alkoxide to bridge two or more metal atoms.

Regardless of the particular form which the alkoxide is visualized to adopt, in practice it is sufficient to recognize that the alkoxide oligomers form upon controlled hydrolysis a series of polymeric oxide alkoxides ranging from the dimer through cyclic forms to linear polymer of up to infinite chain length. More complete hydrolysis, on the other hand, leads to precipitation of insoluble products eventuating, with complete hydrolysis, in orthotitanic acid. See G. Winter, *Oil and Colour Chemists Association* 36, pp. 689–708 December (1953).

For ease of description herein, these materials will be referred to as polymeric oxide alkoxides of the respective transition metals, representing the partial hydrolysis products. The hydrolysis reaction can be carried out separately, and the products isolated and stored for further use, but this is inconvenient especially in view of the prospect of further hydrolysis, hence the preferred practice is to generate these materials in the reaction medium. Evidence indicates that the same hydrolysis reaction occurs in situ.

The hydrolysis reaction itself may be controlled directly by the quantity of water which is supplied to the transition metal alkoxide and the rate of addition. Water must be supplied incrementally or in a staged or sequenced manner: bulk addition does not lead to the desired reaction, effecting excessive hydrolysis, with precipitation of insolubles. Dropwise addition is suitable as is the use of water of reaction, but it is found more convenient to provide the water as water of crystallization, sometimes referred to as cation, anion, lattice or zeolitic water. Thus, common hydrated metal salts are usually employed, where the presence of the salts themselves are not deleterious to the system. It appears that the bonding provided by the coordinated sphere of water in a hydrated salt is adapted to control release and/or availability of water, or water related species to the system as required to effect, engage in or control the reaction.

The overall amount of water employed, as aforesaid, has a direct bearing on the form of polymeric oxide alkoxide which is produced, and thus is selected relative to catalytic performance. (It is believed without limitation that the stereoconfiguration of the partially hydrolyzed transition metal alkoxide determines, or contributes in part to the nature, or result of the catalytic action of the activated catalyst component.)

In general, it has been found sufficient to provide as little as 0.5 moles of water per mole of transition metal. Amounts of up to 1.5 moles are suitable with higher amounts up to 2.0 moles being operable whenever precipitation of hydrolysis products from the hydrocarbon solvent medium may be avoided. This may be achieved in principle by reducing the rate of addition and ceasing addition upon first evidence of precipitation. While it is believed that the reaction is essentially equimolar, a certain excess of water is appropriately employed in some cases, as is customary.

It will be understood that the stereoisomeric form, chain leghth, etc. of the hydrolysis product may be somewhat altered with the elevated temperature required by the ensuing reaction with the reducing metal, and in situ processes likewise will affect equilibria through the mass action effect. Likewise, the cogeneration of alkanol may affect equilibria, reaction rates, etc.

The hydrolysis reaction proceeds under ambient conditions of pressure and temperature, and requires no special conditions. A hydrocarbon solvent may be used, but is not required. Mere contact of the materials for a period of time, usually 10–30 minutes to 2 hours is sufficient. The resultant material is stable under normal storage conditions, and can be made up to a suitable concentration level as desired, simply by dilution with hydrocarbon solvent.

The polymeric transition metal oxide alkoxides are reacted with a reducing metal having an oxidation potential higher than the transition metal. Preferably a polymeric titanium oxide alkoxide is employed together with magnesium (or calcium, potassium, aluminum or zinc), as the reducing metal.

Combinations of transition metal alkoxide, reducing metal and hydrated metal salt are usually selected with reference to electropotentials to minimize side reactions, as known in the art; and in general, to assure preferred levels of activity for olefin polymerization, magnesium values are supplied to the system by appropriate selection of reducing metal/hydrated metal salt, and most preferably employing magnesium as the reducing metal. In certain cases, as with magnesium, it is preferred to employ a hydrated salt of magnesium, whereas in other cases, it may be determined that the reducing metal should be distinct from the remaining metal values provided to the system, particularly where the reducing metal is multivalent, to avoid undesirable side reactions.

In the preferred embodiment (to which illustrative reference is made in the following text, as a matter of convenience), titanium tetra-n-butoxide (TBT) is reacted with magnesium turnings and a hydrated metal salt, most preferably magnesium chloride hexahydrate, at a temperature of 50°–150° C., in a reaction vessel under autogenous pressure. TBT may constitute the reaction medium, or a hydrocarbon solvent may be used. Ti/Mg molar ratios may vary from 1:0.1 to 1:1 although for the most homogeneous reaction system a stoichiometric relationship of $Ti^{IV}$ to $Mg°$ of 1:1 is preferred, with an amount of hydrated metal salt to supply during the reaction about 1 mole of water per mole of Mg.

The hydrocarbon soluble catalyst precursor comprises predominently Ti values in association with Mg values, in one or more stereoconfigurational complexes believed to constitute principally oxygenated, at least partially reduced transition metal species. Some evidence of mixed oxidation states of the titanium values suggests an interrelated system of integral species of $Ti^{IV}$, $Ti^{III}$, and $Ti^{II}$ values perhaps in a quasi-equilibrium relation at least under dynamic reaction conditions. The preferred precursor is believed, without limitation, to incorporate (Ti-O-Mg) bridging structures.

The intermetallic compounds have special interest as catalyst precursors, in support or unsupported systems, for isomerization, dimerization, oligomerization or polymerization of alkenes, alkynes or substituted alkenes in the presence or absence of reducing agents or activators, e.g., organometallic compounds of Group IA, IIA, IIIA or IIB metals.

In the preferred utilization of such precursors, they are reacted with a halide activator such as an alkyl aluminum halide, a silicon halide or a boron halide, and combined with an organometallic compound such as an aluminum alkyl to form a catalyst system adapted particularly to the polymerization of ethylene and comonomers, especially in slurry polymerizations to provide a range of useful resins from LLDPE to HDPE.

DETAILED DESCRIPTION OF THE INVENTION

The transition metal component is an alkoxide, normally a titanium or zirconium alkoxide comprising essentially -OR substituents where R may comprise up to 10 carbon atoms, preferably 2 to 5 carbon atoms, and most preferably n-alkyl such as n-butyl. The selected component is normally liquid under ambient conditions and the reaction temperatures for ease of handling, and to facilitate use of the titanium component is also hydrocarbon soluble.

It is generally preferred for facility in conducting the related hydrolysis reaction to employ transition metal compounds which comprise only alkoxide substituents, although other substituents may be contemplated where they do not interfere with the reaction in the sense of detrimentally affecting performance in use. In general, the halide-free n-alkoxides are employed although, for example, di-n-butoxy titanium dichloride and the like may be suitably employed.

The transition metal component is provided in the highest oxidation state for the transition metal, to provide the desired stereoconfigurational structure, among other considerations. The term transition metal is used in its customary broad sense to denote the transition elements in which the penultimate electron shell is electron deficient, but is illustrated principally by reference to the readily available members of Group IVB and VB of the Periodic Table. Other transition metals forming stable alkoxides useable in olefin polymerization or other catalytic processes may be employed as desired. Most suitably, especially for olefin polymerization, the alkoxide is a titanium or zirconium alkoxide. Suitable titanium compounds include titanium tetraethoxide, as well as the related compounds incorporating one or more alkoxy radicals including n-propoxy, iso-propoxy, n-butoxy, isobutoxy, sec-butoxy, tertbutoxy, n-pentoxy, tert-amyloxy, n-hexyloxy, n-heptyloxy, nonyloxy, and so forth. One or more transition metal alkoxides may be admixed for reaction, e.g., mixtures in all proportions of titanium and zirconium alkoxides may be used.

Some evidence suggests that the rate of hydrolysis of the normal derivatives decreases with increasing chain length, and the rate decreases with molecular complexity viz. tertiary, secondary, normal, hence these considerations may be taken into account in selecting a preferred derivative. In general, titanium tetrabutoxide has been found eminently suitable for the practice of the present invention, and related tetraalkoxides are likewise preferred. It will be understood that mixed alkoxides are perfectly suitable, and may be employed where conveniently available. Complex titanium alkoxides sometimes inclusive of other metallic components may also be employed.

The reducing metal is supplied at least in part in the zero oxidation state as a necessary element of the reaction system. A convenient source is the familiar turnings, or ribbon or powder. As supplied commercially, these materials may be in a passivated surface oxidized condition and milling or grinding to provide at least some fresh surface may be desirable, at least to control reaction rate. Such grinding or milling is not, however, a necessary step to the preparative process. Mixtures of reducing metals may also be conveniently employed particularly where the source of principal reducing metal is impure or is available as an amalgam with other metals, e.g., magnesium/aluminum. The reducing metal may be supplied as convenient, in the form of a slurry in the titanium component and/or hydrocarbon diluent, or may be added directly to the reactor.

Whether in the case of the in situ preparation (or for independent preparation of the polymeric transition metal alkoxide), the source of water, or water related species is provided, whereby quantities of water are released or diffused or become accessible, as the case may be, in a delayed rate controlled manner during the reaction. As aforesaid, the coordination sphere afforded by a hydrated metal salt has been found suitable for the purpose; but other sources of water in the same proportions are also useable. Thus, calcined silica gel containing controlled amounts of bound water may be employed. In general, the selected material provides a controlled source of water, i.e., constitutes an aquo complex where water is loosely bonded, as in a coordination sphere about a metal salt, by hydrogen, lattice or limited electrovalent forces. Suitable materials include the hydrated metal salts (especially the inorganic salts) such as the halides, nitrates, sulphates, carbonates and carboxylates of sodium, potassium, calcium, aluminum, nickel, cobalt, chromium, magnesium, and the like.

The interaction of these components is conveniently carried out in an enclosed reactor, preferably coupled with reflux capacity for volatile components at the elevated temperatures produced in the reaction vessel. Autogenous pressure is employed, as the reaction proceeds smoothly under ambient conditions, with heating to initiate and maintain the reaction. As in any such reaction stirring is preferred simply to avoid caking or coating of vessel surfaces, to provide intimate admixture of components, and to ensure a homogeneous reaction system.

Usually, a hydrocarbon solvent such as hexane, heptane, octane, decalin, mineral spirits and the like is also used to facilitate intermixture of components, heat transfer and maintenance of a homogeneous reaction system. Saturated hydrocarbons are preferred, having a boiling point in the range of 60° to 190° C. The liquid transition metal component also may serve at least in part as the reaction medium, especially where no added solvent is employed. The reaction involves a stage where additional volatile components form azeotropes with the solvent, or if the components are employed neat, constitute the source of reflux, but in either case it is preferred at least to effectuate the reaction through intermediate stages with appropriate reaction times, to return volatiles to the reaction zone. Thus, butanol is generated when the titanium component is titanium tetra n-butoxide forming an azeotrope with the hydrocarbon solvent. Selection of solvent and/or alkoxide relative to possible suppression of reaction temperature is accordingly a consideration, as is known to one skilled in the art.

Reaction temperature will to some extent be a matter of choice within a broad range, depending upon the speed of reaction conveniently to be conducted. It has been found that the reaction system (constituted by the liquid transition metal component, dissolved hydrated metal salt, reducing metal particles and solvent, where desired) evidences visible gas generation at about 60°–70° C. suggesting an initiation temperature or activation energy level at about 50° C. which therefore constitutes the minimum necessary temperature for reaction of the polymeric oxide alkoxide with the reducing metal. The reaction is somewhat exothermic during consumption of the reducing metal, hence may be readily driven to the ensuing stage, being the reflux temperature. As the alkanol generated is largely consumed in the course of the continuing reaction (as an independent species), the actual system temperature will change, and completion of the reaction is evidenced by consumption of visible metal and/or attainment of the reflux temperature for the pure solvent within a period of as little as 30 minutes to 4 hours or more. Such temperatures may reach 140°–190° C. and of course higher temperatures might be imposed but without apparent benefit. It is most convenient to operate within the range of 50°–190° C. preferably 70°–140° C. In the absence of solvent, the upper limit will simply be established by the reflux temperature for the alkanol generated in the course of the reaction.

Reaction of the components is most clearly apparent from the marked color change, with exotherm, that accompanies commencement of gas evolution. Where lack of opacity or turbidity of the solution admits observation, evolution of gas ranging from bubbling to vigorous effervescence is most evident at the surface of the magnesium metal, and the generally light colored solutions immediately turn greyish, then rapidly darker to blue, sometimes violet, usually blue black, sometimes with a greenish tint. Analysis of the gas evidences no HCl; and is essentially $H_2$. Following the rapid color change some deepening of color occurs during a gradual increase of temperature, with continuing gas evolution. In this stage, the alkanol corresponding to the alkoxide species is generated in amount sufficient to suppress the boiling point of the solvent, and appears to be gradually consumed in a rate related manner, along with the remaining metal.

The reaction product is hydrocarbon soluble at least in part, and is maintained in slurry form for convenience in further use. The viscous to semi-solid product, when isolated, evidences on X-ray diffraction analysis, an essentially amorphous character. The color change and consumption of reducing metal is believed to evidence at least partial reduction of the transition metal, hence reference to reduced polymeric transition metal oxide alkoxides. While reference herein is made principally to the reducing potential of the metal, e.g., magnesium reactant, it is believed that the metal values themselves which are retained in the catalyst precursor contribute structurally and functionally to the catalyst characteristics. Thus, it is believed that the magnesium metal in its oxidized state forms a part of the oxide alkoxide structure, as aforesaid, for example, linking through oxygen to transition metal, viz., forming —TiOMg— linkages in the polymeric structure or, more generally, —TrOMr— wherein Tr represents transition metal and Mr is reducing metal.

Molar ratios of the components may vary within certain ranges without significantly affecting the performance of the catalyst precursor in ultimate use. Thus, to avoid competing reactions rendering the reaction product inconveniently gelatinous or intractable, the transition metal component is ordinarily supplied in at least molar proportion relative to the reducing metal, but the transition metal reducing metal ratio may range from about 0.5 to 1.0 to 3.0 to 1.0 or more, preferably 1/0.1–1/1. An insufficient level of reducing metal will result in suppression of the reaction temperature such that the reflux temperature of the pure solvent remains unattained; whereas an excess of reducing metal will be immediately apparent from the unconsumed portion thereof, hence the desired amount of this component is readily ascertained by one skilled in the art.

Within these ranges, a varying proportion of the reaction product may constitute a hydrocarbon insoluble component which, however, may be and commonly is slurried with the soluble component for use, e.g., further reaction with a halide activator to form an olefin polymerization catalyst. The amount of such insoluble component may be controlled in part by the use of a solvent with an appropriate partition coefficient but where use of a common hydrocarbon solvent such as octane is preferred for practical reasons, equimolar ratios of, e.g., Ti/Mg/$H_2O$ components have been found most adapted to the formation of a homogeneous reaction product.

The water, or water-related species is also preferably supplied in molar ratio to the transition metal component, for similar reasons of homogeneity and ease of reaction. Thus, in the case of $MgCl_2.6H_2O$, an amount of 0.17 moles supplies during the reaction about 1 mole of water and this proportion up to about 2 moles of water, provides the most facile reactions, with one or more moles of transition metal component. More generally, the $H_2O$ may range from about 0.66 to 3 moles per mole of transition metal. The amount of water present at any given stage of the reaction, of course is likely to be considerably less, ranging to catalytic portions relative to the remaining components, depending upon the manner and rate at which it participates in the reaction sequence, presently unknown. It is nevertheless specifically contemplated without limitation, as an operative hypothesis that the water, or the rate of reaction controlling water-related species is activated, released, made accessible to or diffuses in a manner providing such species in a regular, sequenced, constant or variable rate-related manner. The same molar proportion of free water supplied at the commencement of the reaction is however wholly ineffective in initiating reaction at this or higher temperature, and results in undesirable complete hydrolysis reactions.

The measured amount of water is essentially in molar balance or molar excess relative to the reducing metal component and appears to be related to its consumption in the reaction, as a molar insufficiency of water will invariably result in excess reducing metal remaining. In general, a modest excess of water of 10–40% is suitable to ensure complete reaction. Higher proportions are suitable without limitation but should be kept in relative stoichiometric balance to the transition metal component.

Where the source of water is a hydrated metal salt, the salt may be occluded in the resulting reaction product. While the salt may not participate directly in the reaction, there is no apparent necessity for its removal particularly where it may be desired to dope the precursor with selected cations. In fact, in certain instances the salt or other source of water such as silica gel is preferentially retained, to provide flow control of the catalyst precursor in feed to further stages such as activation or polymerization. Further it may be postulated that the salt acts as a scavenger or exchange site for alkoxide, e.g., butanolic species in the course of the reaction.

The selection of aquo complexes or hydrated metal salts where employed is essentially a matter of practicality and economics since the primary characteristic of this reactant is the controlled availability of water it affords to the system. Thus, sodium acetate trihydrate is suitable, as is magnesium acetate tetrahydrate, magnesium sulphate heptahydrate and magnesium silicon fluoride hexahydrate. A salt of maximum degree of hydration consistent with the controlled release afforded by the coordinate bonding relationship is preferred. Still other useable hydrated salts include magnesium acetylacetonate dihydrate, aluminum chloride hexahydrate, calcium chloride dihydrate, chromium chloride hexahydrate, cobalt chloride hexahydrate, nickel chloride hexahydrate, and ferric chloride hexahydrate. Most conveniently, a hydrated magnesium halide such as magnesium chloride hexahydrate or magnesium bromide hexahydrate is employed. These salts, like other hygroscopic materials, even when supplied in commercial anhydrous form contain some sorbed water, (e.g., U.K. Pat. No. 1,401,708 reports a level of 17 mg/kg), although well below molar quantities contemplated in accordance with this invention. Hence, anhydrous grade salts, unless specially modified for the purpose are not suitable as reactants.

In a preferred aspect of the invention the reaction product (catalyst precursor) is further interreacted with a halide activator.

By 'halide activator' it is intended to denote a class of materials typified by the presence of halogen understood to be abstractable or exchangeable in interreaction with transition metal catalyst precursors (although the presence of transition metal-halogen bonding cannot be confirmed) and commonly employed in the Ziegler catalyst art, such as the alkyl aluminum halides, silicon halides, alkyl silicon halides, titanium halides, boron halides and alkyl boron halides. These compounds may or may not have reducing potential as, in accordance with the present invention, they are normally reacted with the polymeric transition metal oxide alkoxides in the reduced state, i.e., wherein the transition metal exists at least in significant part in a state below its maximum oxidation potential. In the latter case, the polymeric transition metal oxide alkoxide is reacted with the reducing metal prior to interreaction thereof with the halide activator, i.e., the reactions are carried out sequentially. The use of the reduced polymeric transition metal oxide alkoxides thus permits the utilization of such non-reducing halide activators as the silicon or boron halides, affording flexibility of operation and advantages such as reduced extractables in olefin resins produced therewith, e.g., isopentane extractables of less than 6 wt.%, preferably less than 3 wt.% for as-produced polyethylene. It has been found that the catalyst precursor may be activated readily, by merely combining the product with the halide activator. The reaction is vigorously exothermic, hence the halide activator is typically added gradually to the reaction system, which may be maintained with cooling, e.g., to 10°–13° C. for ease of handling.

The halide activator is commonly supplied for interreaction at a molar ratio of 3:1 to 6:1 (aluminum, silicon or boron, relative to the transition metal) although ratios of 2:1 or more have been used successfully. Normally, upon completion of addition, the reaction is also complete and may be terminated. The solid reaction product, or slurry may then be used immediately, or stored for future use. Usually for best control over molecular weight characteristics, and particularly for production of low density resin, only the hydrocarbon washed solid reaction product is employed as the catalyst, although the supernatant is also catalytically active. In such case, the halogenated precursor slurry is settled and decanted a number of times with relatively large volumes of hydrocarbon solvent. While any such solvent may be used, to avoid complexities in recovery or recycle the solvent for catalyst preparation, preferably n-octane is employed in the washing operation, in amounts of about 25:1 (wgt/wgt) of solvent to catalyst as transition metal.

The catalyst wash necessarily leads to some loss of transition metal values but reduces resin $Cl^-$ levels, minimizes reactor fouling and provides improved polymer morphology. Elemental analysis (wgt% of isolated solids) shows Ti 6.3%, Mg 11.4%, Si 5.1%, and Cl 46.8% for a 1/0.75/0.128 catalyst precursor formed from TBT/Mg°/$MgCl_2.6H_2O$, activated with 3/1 $SiCl_4$.

The resultant catalyst product may be used directly in the polymerization reaction although it is typically diluted, extended or reduced as required to provide in a convenient feed an amount of catalyst equivalent to 80–100 mg/transition metal based upon a nominal productivity of greater than 200,000 gm polymer/gm transition metal in continuous polymerizations which the present catalyst typically exceeds (e.g., 250,000 to 1,000,000 g/g). Adjustments are made by the artisan to reflect reactivity and efficiency, ordinarily by mere dilution, and control of feed rates.

The transition metal containing catalyst is suitably combined for use in olefin polymerization with an organometallic cocatalyst such as triethyl aluminum or triisobutyl aluminum or a non-metallic compound such as triethylborane. A typical polymerizer feed thus comprises 42 parts of isobutane solvent, 25 parts of ethylene, 0.0002 parts of catalyst (calculated as Ti), and 0.009 parts co-catalyst (TEA, Calculated as Al), provided to a reactor maintained at 650 psig. and 160° F. In general, the amount of co-catalyst, where employed is calculated to range from between about 30 to 50 ppm calculated as Al or B, based upon isobutane. In general, the activity of the catalyst is responsive to the molar ratio of the co-catalysts, i.e., high ratios of, e.g., Al/Ti into the range of 24/1 to 48/1 or more, correlate with higher activity levels.

Examples of metallic co-catalysts include trialkyl aluminums, such as triethyl aluminum, triisobutyl aluminum, and tri-n-octyl aluminum, alkyl aluminum halides, alkyl aluminum alkoxides, dialkyl zinc, dialkyl magnesium, and metal borohydrides including those of the alkali metals, especially sodium, lithium and potassium, and of magnesium, beryllium and aluminum. The non-metal co-catalysts include boron alkyls such as triethyl borane, triisobutyl borane and trimethyl borane and hydrides of boron such as diborane, pentaborane, hexaborane and decaborne.

The polymerization reactor is preferably a loop reactor adapted for slurry operation, thus employing a solvent such as isobutane from which the polymer separates as a granular solid. The polymerization reaction is conducted at low pressure, e.g., 200 to 1000 psi and a temperature in the range of 100° to 200° F. with applied hydrogen as desired to control molecular weight distribution. The polymerization may nevertheless be conducted at higher pressures, e.g., 20,000 to 40,000 psi, in autoclave and tubular reactors, where desired.

Other n-alkenes may be fed to the reactor in minor proportion to ethylene, for copolymerization therewith. Typically, butene-1 or a mixture thereof with hexene-1 or octene-1 is employed, in an amount of 3 to 10 mol%, although other alpha olefin comonomers/proportions may be readily used. In utilizing such n-alkene comonomers, one may secure resin densities over the range from 0.91 to 0.96. Still other alpha olefin comonomers, such as 4-methyl-pentene-1, 3-methyl-butene-1, isobutylene, 1-heptene, 1-decene, or 1-dodecene may be used, from as little as 0.2% by weight, especially where monomer admixtures are employed.

In referring herein to an intermetallic "compound" or "complex" it is intended to denote any product of reaction, whether by coordination or association, or in the form of one or more inclusion or occlusion compounds, clusters, or other interengagement under the applicable conditions, the integrated reaction in general being evidenced by color change and gas evolution, probably reflective of reduction-oxidation, rearrangement and association among the unconsumed elements of the reaction system.

The following Examples (referring in turn to Catalyst Component Preparation including Comparative Examples; Catalyst Activation; and Polymerization including use of the resin in formation of shaped articles) taken in conjunction with the foregoing description serve to further illustrate the invention, and of the manner and making and using same. All parts are by weight except as otherwise noted. Melt indices are measured under conditions E & F, respectively, of ASTM D-1238-57T, for MI and HLMI values, on powder or resin samples as specified. HLMI/MI or MIR is melt index ratio, a measure of shear sensitivity reflecting molecular weight distribution. Other tests are as indicated, or as conventionally conducted in the related arts.

EXAMPLE I

A. 6.0 pts. of $Ti(OBu)_4$ [TBT] and 4.2 pts. of $CrCl_3 6H_2O$ were combined in a reaction vessel. The chromium salt was partially dissolved, and some heat was evolved upon stirring. Complete dissolution was accomplished with mild heating to 60°–70° C. An additional 3.3 pts. of chromium salt was dissolved with stirring over a period of 20 minutes. To the green solution there was added in portions a total of 0.3 pts. of magnesium shavings, which caused vigorous gas evolution. The cooled reaction product free of excess magnesium (which had completely disappeared), was a viscous green liquid, soluble in hexane.

B. In a similar run anhydrous chromium chloride was employed with the titanium alkoxide, but no reaction occurred, with heating at greater than 100° C. for a half hour. Addition of zinc dust and further heating at greater than 150° C. still evidenced no reaction. Substitution of magnesium shavings also resulted in no reaction. It was concluded that the hydrated salt was a necessary component of the reaction system.

EXAMPLE II

A. TBT (0.121 m), $CrCl_3.6H_2O$ (0.015 m) and $Mg°$ (0.0075 m) were combined in a stirred reaction vessel equipped with an electric heating mantle. The chromium salt was wholly dissolved at about 60° C., and reaction with the magnesium shavings was apparent from gas evolution at 85° C., which was vigorous at 100° C., subsiding at 116° C. with some Mg remaining. After dissolution of the remaining Mg, heating was continued, to a total reaction time of 1 hour and 45 minutes. The reaction product at room temperature was a dark green liquid which dissolved readily in hexane.

B. In the same manner, a reaction product was prepared in the proportions 0.116 m TBT, 0.029 m $CrCl_3.6H_2O$ and 0.029 m Mg. A muddy green reaction product at 118° C. took on a definite bluish color at 120° C. with continued gas evolution. The reaction was terminated upon the disappearance of magnesium in one hour and fifteen minutes. The reaction product was soluble in hexane.

C. The aforedescribed runs were again replicated in the reactant amounts 0.116 m TBT, 0.058 m $CrCl_3.6H_2O$, 0.0145 m Mg. The reaction was completed in 115 minutes, and a hexane soluble product resulted.

D. The ratio of the reactants was again modified in a further run, to 0.115 m TBT, 0.0287 m $CrCl_3.6H_2O$, and 0.0144 m Mg. A muddy green material evident at 114° C. became blue at the Mg surface. The recovered reaction product was hexane soluble.

E. In a similar run, 0.176 m TBT, 0.30 m $CrCl_3.6H_2O$ and 0.176 m $Mg°$ were reacted in octane. The clear green color of the reaction at 70° C. turned muddy with increasing gas evolution and darkened to almost black at 90° C. The color returned to green at 119° C. and the reaction was terminated at 121° C. with complete disappearance of the magnesium. The reaction product (6.9 wgt.%, Ti, 3.5 wgt.% Mg, 1.3 wgt.% Cr) was a dark olive green liquid and a solid of darker color (about 50:50/volume) which settled out.

F. In yet another run in octane, the reactants were provided in the proportions 0.150 m TBT, 0.051 m $CrCl_3-6H_2O$ and 0.150 m Mg. Again, the muddy green color changed to almost black with vigorous effervescence, forming at 109° a dark blue black reaction product. (5.7 wgt.% Ti; 2.9% Mg, 2.1 wgt% Cr).

EXAMPLE III

A. The reaction product IIE was combined in a reaction vessel with isobutylaluminum chloride added dropwise in proportions to provide a 3:1 Al/Ti molar ratio. The green colored mixture changed initially to brown violet at 38° C., which upon completion of reactant addition at 39° C. had changed to red brown in appearance. After 30 minutes additional stirring, the reaction was terminated, the product being a dark red brown liquid and a dark brown precipitate.

B. Reaction product IIF was similarly reacted with isobutyl aluminum chloride (3.1 Al/Ti molar ratio). The peak temperature with complete addition was 48° C., but no brown color change was evident. The reaction product was a clear liquid and a dark grey precipitate.

EXAMPLE IV

The catalyst components prepared in Example III above were employed in the polymerization of ethylene (190° F., 10 mol% ethylene, 0.0002 pts. catalyst calculated as Ti, triethyl aluminum about 45 ppm, calculated as Al, $H_2$ as indicated) with results set forth in Table I, as follows:

TABLE I

| Catalyst | $H_2$ psig | Prod. g Pe/g Ti hr | Resin Properties | | |
|---|---|---|---|---|---|
| | | | MI | HLMI | HLMI/MI |
| IIIA | 60 | 35160 | 10.1 | 265 | 26.3 |
| | 120 | 29220 | 18.9 | 618 | 32.6 |
| IIIB | 60 | 30380 | 9.6 | 264 | 27 |
| | 120 | 26880 | 32.8 | 855 | 26.1 |

In the following Example, the catalyst component of the invention was prepared from the reactant admixture in the absence of added solvent.

EXAMPLE V

A. 0.1212 m Ti(OBu)$_4$ [TBT], 0.121 m magnesium turnings and 0.0012 m MgCl$_2$.6H$_2$O (TBT/Mg/MgCl$_2$.6H$_2$O=1:1:0.01 molar) were combined in a stirred reaction vessel equipped with an electric heating mantle. The magnesium salt dissolved entirely at room temperature, forming a homogeneous reaction mixture. The mixture was heated gradually and at 95° C. gas evolution commenced on the surface of the magesium turnings. At 140° C. with reflux the bubbling had become vigorous. The solution darkened in color and the bubbling ceased at 170° C., whereupon the reaction product was terminated. The reaction product contained excess magnesium—only about 8.5 percent charged had reacted—and was soluble in hexane.

B. In another run, the molar ratio of MgCl$_2$.6H$_2$O was increased (TBT/Mg/MgCl$_2$.6H$_2$O=1:1:0.1 molar). The gold yellow liquid became greyish with gas evolution at 104° C., and darkened with further heating to 168° C. After 125 minutes of reaction time, the reaction product contained some excess magnesium—about 63 percent had reacted.

C. In a further run, the molar ratio employed was 1:1:0.17. The dark blue reaction product was very viscous and could not be readily diluted with hexane. All of the magnesium was consumed.

The following Example shows the preparation carried out in a hydrocarbon solvent.

EXAMPLE VI

A. 50.2 pts. (0.148 m) of TBT was added to a stirred reaction vessel equipped with an electric heating mantle, and 58.6 pts. octane. The magnesium turnings (0.074 m) were added, stirring commenced and then 0.0125 m MgCl$_2$.6H$_2$O added with heating over one minute. At 75° C. (20 minutes) the magnesium salt had entirely dissolved, and at 95° C. (25 minutes) gas evolution at the surface of the magnesium turnings commenced, the evolution increasing as the solution turned greyish and then deep blue, with refluxing at 117° C. (35 minutes). The magnesium metal had entirely reacted within 1 hour (128°–129° C.) and the reaction was terminated. The dark blue reaction product, solubilized in octane (a small amount of a greenish precipitate remained), was calculated to contain 6.8 wgt% Ti and 2.0 wgt% Mg values (Ti/Mg 3.4 to 1 by weight, 1.7 to 1 molar).

B. The foregoing run was essentially repeated except that molar ratios of the reactants were modified with results as follows:

| Ti/Mg/MgCl$_2$.6H$_2$O Mol Ratio | Ti/Mg (Molar) | Notes |
| --- | --- | --- |
| 1.0/0.65/0.11 | 1.32 | Dark blue black liquid and green precipitate. 6.6 wgt % Ti, 2.6 wgt % Mg values (calc) |
| 1.0/0.75/0.128 | 1.14 | Blue solution with greenish tint. 6.5 wgt % Ti, 2.8 wgt % Mg values (calc) |
| 1.0/1.0/0.085 | 0.92 | Blue black liquid with light green precipitate (insoluble in acetone, alkane and methylene chloride) Some unreacted Mg° |
| 1/1/0.17 | 0.85 | Dark blue black liquid, 6.6 wgt % Ti, 3.9 wgt % Mg values (calc) |
| 1/1/0.34 | 0.75 | Dark blue black liquid, 6.7 wgt % Ti, 4.6 wgt % Mg values (calc) |
| 1/1/0.51 | 0.66 | Milky blue liquid. 3.7 wgt % Ti, 2.9 wgt % Mg values (calc) |
| 1/2/0.17 | 0.46 | Dark blue black liquid and viscous green gel. Some unreacted Mg° |
| 1/2/0.34 | 0.43 | Dark blue black liquid and viscous gel. Some unreacted Mg. |
| 2/1/0.17 | 1.70 | Example IIA |
| 2/1/0.34 | 1.50 | Blue black solution. 7.1 wgt % Ti, 2.3 wgt % Mg values (calc) |
| 3/1/.51 | 1.99 | Blue black liquid with slight green tint. 6.1 wgt % Ti, 1.6 wgt % Mg values (calc) |

C. The preparation 1/1/0.34 obtained above was repeated except that 63.7 pts. TBT was employed with 67.5 hexane as the solvent reaction medium. A dark blue black liquid resulted, containing by calculation 8.2 wgt% Ti and 1.6 wgt% Mg values.

The following Example shows the stepwise preparation of the catalyst component.

EXAMPLE VII 2.61 pts. MgCl$_2$.6H$_2$O and 34.2 pts. TBT were combined with stirring. Within 30 minutes, the yellow liquidcrystalline salt mixture was replaced with a milky yellow, opaque, viscous liquid. Prolonged stirring resulted in a fading of the cloudiness to yield within 2 hours a clear yellow liquid (In a second run conducted in octane within 30 minutes the salt had totally dissolved to yield a yellow liquid with no intervening precipitate or opaqueness.)

A TM Mg reaction product was prepared in the manner of foregoing Examples, utilizing the clear yellow liquid prepared above, and 1.83 pts. of Mg°, for a 1/0.75/0.128 molar ratio of components in octane. The reaction proceeded smoothly to a dark blue black liquid and green precipitate in the same manner as other reported reactions.

The reaction product was activated with ethyl aluminum dichloride at a 3/1 Al/Ti ratio to form a catalyst component for olefin polymerization.

The following Example evidences the significance of level of bound water.

EXAMPLE VIII

A series of identical runs were performed at the molar ratio 1/0.75/0.128 (TBT/Mg/MgCl$_2$.6H$_2$O) except that the degree of hydration of the magnesium salt was modified.

When MgCl$_2$.4H$_2$O was employed (H$_2$O/Mg=0.68/1 as compared to 1:1 for MgCl$_2$.6H$_2$O), only 89.1% of the magnesium metal reacted. Use of MgCl$_2$.2H$_2$O at the same overall molar ratio (H$_2$O/Mg 0.34/1) resulted in only 62.1% reaction of Mg°.

In repeat runs, the amount of hydrated salt supplied was increased to provide a 1/1 H$_2$O/Mg ratio. All of the magnesium metal reacted. It was also observed that the amount of insoluble reaction product increased with increasing salt levels.

The following Example illustrates the use of other titanium compounds.

EXAMPLE IX

A. 45.35 pts. (0.1595 m) Ti(OPr$^i$)$_4$, 0.1595 m Mg° and 50.85 pts. octane added to a stirred reaction flask fitted with an electric heating mantle, and 0.027 m of MgCl$_2$.6H$_2$O were added. The milky yellow mixture became grey with reflux, at about 88° C., and turned blue at 90° C. with gas effervescence. Based upon magnesium remaining, it was concluded that the reaction was partially suppressed by the octane/isopropanol azeotrope present.

B. The reaction described in A was repeated, at a reactant mol ratio of 1/0.75/0.128 using decalin (b.p 185°–189° C.) as the diluent. After six hours, the reflux temperature had attained 140°, and the reaction was terminated. A dark blue black liquid was obtained with a small amount of dark precipitate. Only 8.8% of the magnesium had reacted.

C. In a similar manner, reaction with tetraisobutyl-titanate was carried out, at a mole ratio of 1/0.75/0.128, providing a blue black liquid and dark precipitate. About 50% of the magnesium reacted.

D. Titanium tetranonylate was similarly employed, with magnesium and MgCl$_2$.6H$_2$O, at a mole ratio of 1/0.75/0.128. A blue liquid was formed, 45% of the magnesium having been consumed.

E. The reaction product of titanium tetrachloride and butanol, (believed to be dibutoxy titanium dichloride) was reacted with magnesium and magnesium chloride hexahydrate at a molar ratio of 1/0.75/0.128 under conditions similar to the above examples. About half the magnesium was consumed in about 3 hours, whereupon a dark blue black liquid and an olive green precipitate (50/50 v/v) was recovered.

The following Example employs a zirconium metal alkoxide.

EXAMPLE X

A. 12.83 parts of Zr(OBu)$_4$.BuOH (0.028 m); 0.34 pts. Mg° (0.14 m) in the form of commercially available turnings, and 8.8 pts. octane were placed in a reaction vessel and heated to reflux at 125° C. with stirring for 15 minutes, without evidence of any reaction. 0.97 pts. of MgCl$_2$.6H$_2$O (0.005 m) was added whereupon vigorous effervescence was noted, and the reaction mixture became milky in appearance.

B. In a second run 31.7 pts. of the zirconium compound (0.069 m) was combined with the magnesium metal turnings (0.069 m) and 57.6 pts. mineral spirits (bp 170°–195° C.) and 4.79 pts. MgCl$_2$.6H$_2$O (0.0235 m) was added with stirring. Heat was applied to the reaction vessel via an electric mantle. Within 5 minutes, the reaction mixture had become opaque in appearance, and gas evolution from the surface of the magnesium metal was evident when the temperature had attained 85° C., at 8 minutes reaction time. Gas evolution continued with vigorous effervescence, the temperature rising to 108° C. when a whitish solid appeared. With continued heating to 133° C. (1 hour reaction time) all of the magnesium metal had disappeared, the reactor containing a milky white liquid and a white solid. The reaction mixture was cooled and 92 pts. of a mixture collected, containing 6.8 wgt% Zr and 2.4% Mg (2.8:1 Zr/Mg by weight; 0.75 Zr/Mg molar ratio) which was soluble in hydrocarbons.

The reaction product may be activated in known manner with, e.g., an alkyl aluminum halide by reaction therewith conveniently at a molar ratio of about 3/1 to 6/1 Al/Zr to provide, in combination with an organic or organometalic reducing agent, an olefin polymerization catalyst system adapted to the formation of polyethylene resin.

The following Example shows the substitution of calcium for magnesium as the reducing metal.

EXAMPLE XI

A. 0.074 m Ti(OBu)$_4$; 0.074 m Ca° (thick turnings supplied commercially, mechanically cut into smaller pieces) and 0.0125 m MgCl$_2$.6H$_2$O were combined in octane in a stirred reaction vessel equipped with an electric heating mantle. Upon attaining 105° C., the solution darkened in color, and at 108° C., with gas evolution, the solution took on a dark grey appearance. At 110.5° C. rapid gas evolution was evidenced, followed by formation of a dark blue liquid. At 90 minutes, the reaction was terminated and a reaction product comprising a dark blue black liquid with a greenish tint isolated.

The run was repeated at the same molar ratio. 50% of the calcium reacted to provide a dark blue liquid and grey solid containing 6.2 wgt% Ti, 2.6 wgt% Ca, and 1.1 wgt% Mg (molar ratio 1/0.5/0.34) (XI A1).

In another run the same reactants were combined in the molar ratio 0.75/0.128. 63% of the calcium reacted, to provide a blue black liquid and a green solid. The reaction product (molar ratio 1/0.47/0.128) contained 6.6 wgt% Ti, 2.6 wgt% Ca and 0.4 wgt% Mg (XI A2).

B. The reaction product XI A1 were further reacted with ethyl aluminum chloride at a 3/1 and 6/1 Al/Ti molar ratio. The reaction products were diluted with hexane and the halide activator added slowly to control the highly exothermic reaction. In the 3/1 run the off white slurry initially formed resolved upon completion of the reaction to a pink liquid and a white precipitate. At 6/1 Al/Ti ratio, the slurry changed in color to grey, and then lime green.

Reaction product XI A2 was likewise treated with EtAlCl$_2$ at a 3/1 and 6/1 Al/Ti molar ratio. The reactions were smooth, producing at 3/1 a deep brown slurry, and at 6/1 a red brown liquid with a brown precipitate.

C. Reaction products prepared in part B were employed in ethylene polymerization, with results as indicated in the following Table.

TABLE II

| TBT—Ca—MgCl$_2$·6H$_2$O (molar ratio) | Reaction Ratio | H$_2$ (psig) | Productivity (gPE/gTi.hr) | Resin Powder Properties | | |
|---|---|---|---|---|---|---|
| | | | | MI | HLMI | MIR |
| 1/0.5/0.34 | 3/1 | 60 | 40,950 | 3.84 | 131 | 34.1 |
| " | 6/1 | 60 | 43,810 | 1.03 | 47.7 | 46.3 |
| 1/0.47/0.128 | 3/1 | 60 | 20,930 | 1.73 | 73.7 | 42.6 |
| | | 120 | 11,260 | 7.0 | 320 | 45.7 |
| | 6/1 | 60 | 27,420 | 0.35 | 21.0 | 60.1 |

TABLE II-continued

| TBT—Ca—MgCl$_2$·6H$_2$O (molar ratio) | Reaction Ratio | H$_2$ (psig) | Productivity (gPE/gTi.hr) | Resin Powder Properties | | |
|---|---|---|---|---|---|---|
| | | | | MI | HLMI | MIR |
| | | 120 | 33,050 | 1.75 | 116 | 66.0 |

Bench Scale Reactor Conditions
Diluent — Isobutane
Temperature — 190° F.
Hydrogen — as indicated
Co—catalyst — Triethylaluminum (TEAL) at about 45 ppm Al
Ethylene — 10 mole %
Run Time — 60 minutes The runs evidenced a somewhat broader molecular weight distribution in the resin as compared to the use of magnesium as the reducing metal.

The substitution of zinc as the reducing metal is shown in the following Example.

EXAMPLE XII

A. 0.204 m TBT, 0.153 m of Zn° granules, and 0.026 m of MgCl$_2$.6H$_2$O were combined in octane in a stirred enclosed system equipped with reflux, and externally heated. Within 13 minutes (85° C.) a rapid color change to blue black occurred, with increasing gas evolution to vigorous effervescence and foaming. The reaction product, a blue black liquid (no precipitate) comprising 7.7% Ti, 0.9% Zn, and 0.5% Mg by weight, fades to yellow on exposure to air.

B. The reaction product TiZnMg (molar ratio 1/0.86/0.128) was reacted with isobutyl aluminum chloride, at a 3/1 Al/Ti molar ratio, in hexane at 10°-13° C. (XII B1).

C. Preparation of the TiZnMg reaction product (XII A) was repeated, employing Zn dust, with similar results. A further run with mossy zinc utilized only 7% of the zinc, and evidenced formation of a green layer on the zinc surface.

D. The activated reaction product XII B1 prepared above was washed thoroughly in hexane and employed in the preparation of low density polyethylene resin. The reactor was preloaded with sufficient butene-1 to secure target density, and the reaction conducted (with incremental addition of butene-1 along with the ethylene) at 170° F. and 35 psig H$_2$ in the presence of triethyl aluminum as co-catalyst. The resin recovered had the following properties: Density 0.9165, MI 1.68, HLMI 52.1 and MIR 31.

The following Example involves the use of potassium as the reducing metal.

EXAMPLE XIII 62.7 m mol of TBT, 47 m mol of fresh potassium metal (scraped clean of its oxide/hydroxide coating under octane), and 8.0 m mol of MgCl$_2$.6H$_2$O were combined in octane in an enclosed system equipped with reflux, and externally heated. Within 2 minutes at 35° C. the color changed to blue black, and bubbles appeared. Vigorous gas evolution and effervescence followed. Upon disappearance of the potassium metal, the reaction was terminated (at 5 hours). A dark blue black liquid with a small amount of dark blue precipitate was recovered.

Examples XIV-XV describe the use of aluminum as the reducing metal.

EXAMPLE XIV

A. 112.31 pts. of Ti(OBu)$_4$ (0.33 m), 8.91 pts. of Al° (Alfa Inorganicspherical aluminum powder, −45 mesh) and 11.4 pts. of MgCl$_2$.6H$_2$O (0.056 m) [molar ratio 1:1:0.17] were admixed in a reaction vessel with stirring, and heat applied, employing an electric mantle.

When 100° C. was attained in about 10 minutes, the yellow color deepened, and at 118° C. vigorous effervescence commenced, with gas evolution. At 122° C. the refluxing liquid took on a grey cast, and the temperature stabilized, as the reaction mixture changed in color from a deep grey with bluish tint to dark blue then blue black at 27 minutes reaction heating time. The temperature was maintained, rising to 145° C., within 1 hours and 20 minutes, whereupon gas evolution was essentially complete and the reaction was terminated.

The reaction product at room temperature was a viscous liquid, evidencing unreacted aluminum particles. The unreacted aluminum was separated, washed and weighed, indicating that 6.7 pts. Al° reacted. The reaction product contained 7.9 wgt% Ti, 3.4 wgt% Al and 0.7 wgt% Mg (molar ratio 1:0.75:0.17).

B. 9.10 pts. of the reaction product prepared above (0.719 pts. Ti, or 0.015 m Ti) was added in hexane (13.0 pts.) to a reaction vessel in a cooling bath. 0.045 m ethyl aluminum dichloride was added gradually, the temperature being maintained at 15°-20° C. The admixture, stirred for 30 minutes provided a dark red brown slurry and an intractable solid. (B1).

A second run was carried out (0.175 m Ti/0.0525 m Al) without cooling to a peak temperature of 38° C., and a red brown slurry again formed, with an intractable solid deposit (B2).

EXAMPLE XV

The reaction products of Example XIV were employed as catalysts in the polymerization of ethylene under standard conditions (190° F., 60 psig H$_2$) employing triethyl aluminum as a co-catalyst, with results as follows:

| | MI | HLMI | MIR |
|---|---|---|---|
| B1 | 0.14 | 6.45 | 46.1 |
| B2 | 0.38 | 17.4 | 45.7 |

EXAMPLE XVI

A. In a similar manner to the foregoing, 0.133 m TBT, 0.100 m Al°, and 0.017 m AlCl$_3$.6H$_2$O were combined in octane and reacted over 7 hours and 15 minutes to provide a dark blue black liquid and a small amount of a grey solid. About 40 percent of the aluminum reacted to provide a reaction product comprised of 6.6 wgt% Ti and 1.6% al. (XVI A1).

In the same manner, the same reactants were combined in 1/1/0.17 m ratio. About 58% of the Al reacted to provide a reaction product containing 6.5 wgt% Ti and 2.7 wgt% Al. (XVI A2).

B. The reaction products (XVI A1) and (XVI A2) were activated with ethyl aluminum chloride at 3/1 Al/Ti.

C. The solid portion of the activated reaction product (XVI A2) was isolated from the supernatant and employed with TEA as co-catalyst in the polymerization of ethylene, at 170° F., 15 psig $H_2$ to produce resin characterized by MI 0.02, MLMI 1.01, MIR 50.5 and in a second run MI 0.02, HLMI 0.45 and MIR 22.5.

The following Examples are drawn to catalyst components prepared employing other aquo complexes.

EXAMPLE XVII

A. 0.0335 mol TBT and 0.0335 mol Mg° were stirred in octane in a heated reaction vessel, to which 0.0057 mol of $MgBr_2.6H_2O$ was added. (Reaction molar ratio 1/1/0.17). The salt dissolved in six minutes with heating to 65° C. A grey color developed with gas effervescence, and the solution turned blue, then blue black with a greenish tint. The reaction was terminated at 123° C. (about 10% unreacted Mg) after a reaction period of 4 hours and 10 minutes. (XVII A).

In a similar manner, a reaction product was prepared at a mole ratio of (Ti/Mg/$MgBr_2.6H_2O$ = 1/0.65/0.11), which was a blue black liquid and dark green precipitate (6.5 wgt% Ti 2.5 wgt% Mg(calc)).

B. The decanted reaction product (XVII A) was combined with isobutyl aluminum dichloride at Al/Ti levels of 3/1 and 6/1 by gradually adding the alkyl aluminum halide. In the first run (3/1 Al/Ti) a peak temperature of 42° C. was attained with addition at a rate of 1 drop/2-3 sec, whereupon the green liquid turned brown. The reaction product was a red brown liquid and brown precipitate. (IV B-1) the 6/1 product (IV B-2) was prepared in similar manner with the same results.

In a separate run, the reaction product (XVII A) was combined with $SiCl_4$ in the same manner. The reaction product of a 30 minute reaction at a 3/1 Si/Ti ratio was a light yellow liquid and a brown precipitate. A similar run provided a 6/1 Si/Ti reaction product.

C. The activated reaction products XVII B-1 and XVII B-2 (1% Ti by weight) were employed in the polymerization of ethylene (10 mol % in isobutane) at 190° F., with hydrogen modifier and triethyl aluminum cocatalyst (45 ppm Al) and compared to an identical run using magnesium chloride hydrate, with results set forth in Table III as follows:

tion increased. In about 30 minutes gas evolution had slowed and then ceased with consumption of Mg°, and the reaction was terminated. The very dark liquid evidenced no residue. (XVIII A1).

In a second run, the same reactants were combined in the molar ratio TMgFe=1/1/0.34 with similar results. Dilution with hexane caused no precipitate or deposition of residue. (XVIII A2).

B. Reaction product XVIII A1 was activated by reaction with a 50 wgt% solution of ethyl aluminum chloride in hexane at a 3/1 Al/Ti ratio. A brown liquid and solid was recovered, containing 16.5 Mg Ti/g. (XVIII B1).

In a similar manner, reaction product (XVIII A2) was activated. The dark brown liquid changed to a violet slurry and then to a dark grey slurry. The resulting clear liquid and grey precipitate contained 16 Mg Ti/g.

C. Activated reaction product XVIII B1 was employed in the polymerization of ethylene at 190° F., 60 psi $H_2$. 114,320 g PE/g Ti/hr were recovered, exhibiting the following properties: MI 5.1, HLMI 155.3, MIR 30.3.

EXAMPLE XIX

A. 0.160 m Ti $(OBu)_4$, 0.160 m magnesium turnings and 0.027 m $CoCl_2.6H_2O$ were combined in a stirred reaction vessel with 61.2 pts. of octane. The violet cobalt salt crystals provide upon dissolution a dark blue solution. The admixture is heated, employing an electric mantle, and gas evolution on the magnesium surfaces appears at 58° C., increasing to vigorous effervescence at 107° C. within 12 minutes. The clear blue color becomes greyish on further heating and becomes almost black at 123°-125° C. when all the magnesium has disappeared and the reaction is terminated, at 90 minutes. The milky blue reaction product was hydrocarbon soluble, and resolved into a dark blue liquid and a dark precipitate upon standing.

The run was repeated, with essentially identical results.

B. The reaction product of the foregoing preparation was shaken, and 0.0111 m (Ti) was combined with isobutyl aluminum chloride (0.0333 m Al) supplied dropwise to a reaction vessel. The temperature peaked at 40° C., with formation of a greyish precipitate, which upon further addition of $BuAlCl_2$ turned brown. After stirring for an additional 30 minutes the reaction was terminated, providing a dark red brown liquid and a brown

TABLE III

| Catalyst Ti(OBu)$_4$—Mg—A | Al/Ti+ (molar) | H2 (psig) | Productivity (g PE/g Ti-hr) | Powder Resin Properties | | |
|---|---|---|---|---|---|---|
| | | | | MI | HLMI | HLMI/MI |
| A = MgCl$_2$·6H$_2$O | 3/1 | 60 | 42,870 | 1.7 | 61 | 35.9 |
| | | 120 | 49,100 | 12.2 | 348 | 28.5 |
| MgBr$_2$·6H$_2$O | 3/1 | 60 | 105,190 | 24 | 698 | 29 |
| | | 120 | 77,390 | 102 | — | — |
| | 6/1 | 60 | 34,780 | 10.3 | 371 | 36 |
| | | 120 | 37,050 | 17.8 | 639 | 35.9 |

+ Bu$^i$AlCl$_2$

EXAMPLE XVIII

A. 42.23 pts. of TBT (0.124 m) were combined with 3.02 pts. Mg (0.124 m) in octane (42.8 pts.) in the presence of 5.7 pts. $FeCl_3.6H_2O$ (0.02 m) (TMgFe=1/1/0.17 molar) in an enclosed stirred reaction vessel equipped with reflux, and an electric heating mantle. Heating commenced, and within 6 minutes, at 65° C. gas evolution began. The muddy yellow color turned dark brown at 80° C. (7 minutes) and gas evoluprecipitate.

C. The catalyst component prepared in Example XIX above was employed in the polymerization of ethylene (190° F., 10 mol % ethylene, 0.0002 pts. catalyst calculated as Ti, triethyl aluminum about 45 ppm calc as Al, $H_2$ as indicated) with the results set forth in Table IV, as follows:

TABLE IV

| Catalyst | H₂ psig | Prod g PE/g Ti/hr | Resin Properties | | |
|---|---|---|---|---|---|
| | | | MI | HLMI | HLMI/MI |
| XIX B | 60 | 105,180 | 6.2 | 206 | 33.6 |
| | 120 | 75,290 | 33.9 | 950 | 28.1 |

EXAMPLE XX

A. 0.169 m Ti(OBu)₄ [TBT], 0.169 m magnesium turnings, and 0.029 m AlCl₃.6H₂O in octane as a diluent were combined in stirred reaction vessel equipped with an electric heating mantle. The hydrated aluminum salt partly dissolved and at 111° C. the solution rapidly darkened to a black liquid with vigorous effervescence originating with gas evolution at the surface of the magnesium. The solution took on a blue coloration and, with smooth refluxing to 122° C. formed a dark blue-black liquid with some remaining magnesium. At 125° C., all the magnesium metal disappeared, the solution exhibiting a slight green tint. The reaction was terminated, and a dark blue black liquid and green precipitate recovered, in a volume ratio of about 95/5.

B. The reaction product described above was combined with isobutyl aluminum chloride in a molar ratio of 3:1 and 6:1 Al/Ti by dropwise addition of the chloride to a reaction vessel containing the titanium material. In the first reaction (3:1), the alkyl chloride was added at a rate of 1 drop/2–3 seconds until a peak temperature of 42° C. was attained, with a color change from blue-green to brown. After stirring for an additional 30 minutes, the reaction product, a red-brown liquid and a brown precipitate, was isolated. (XX B).

C. In a similar manner, a 6:1 Al/Ti product was secured, with the same results. (XX C).

D. Reaction products XX B AND XX C were employed with triethylaluminum co-catalyst (45 ppm Al) in the polymerization of ethylene (10 mol %) with isobutane diluent at 190° F. and hydrogen as indicated. The runs were terminated after 60 minutes, with results indicated in Table V, as follows:

TABLE V

| Catalyst | H₂ psig | PE mole | Prod g PE/g Ti/hr | Resin Properties | | |
|---|---|---|---|---|---|---|
| | | | | MI | HLMI | HLMI/MI |
| XX B | 60 | 406 | 84,580 | 17.2 | 517 | 30.1 |
| | 120 | 542 | 75,280 | 54.9 | 1413 | 25.7 |
| XX C | 60 | 245 | 54,440 | 4.11 | 129 | 31.4 |
| | 120 | 183 | 34,860 | 26.2 | 801 | 30.5 |

EXAMPLE XXI

A. 0.153 m Ti(OBu)₄ [TBT], 0.153 m Mg° turnings and 0.026 m NiCl₂.6H₂O were combined with 61.75 pts. of octane in a stirred reaction vessel equipped with an electric heating mantle. With heating to 44° C. the yellow solution deepened in color, and gas evolution on the magnesium metal surface became observable at about 57° C. With continued heating, the gas evolution increased until at 102° C. (15 minutes reaction) the reaction system turned a light muddy brown color. Vigorous effervescence continued with darkening of the brown color until at 126° C. (75 minutes) all the magnesium had disappeared, and the reaction was terminated. The reaction product (XXIA-1) was a hydrocarbon soluble dark brown liquid and a small amount of a fine precipitate.

In a second run 0.149 m TBT, 0.149 m Mg, and 0.051 m NiCl₂-6H₂O were combined in octane in the same manner. Mg metal disappeared at 115° C., 120 minutes, and the reaction resulted in a dark brown black hydrocarbon soluble liquid, which resolved on standing to a very fine dark precipitate and a yellow liquid, about 50/50 by volume (XXIA-2).

B. Reaction product IA-1 was shaken, and a portion (0.0137 m Ti) was placed in a reaction vessel with hexane diluent, to which iBuAlCl₂ (0.0411 m Al) was added dropwise, at a rate of 1 drop/2–3 sec. to 28° C., and 1 drop/sec. to a peak temperature of 39° C. After completion of addition the vessel contents were stirred for 30 minutes, and the reaction product, a dark red brown liquid and a dark grey precipitate, isolated. (XXIB-I).

The same reaction product (XXIA-1) was combined with ethyl aluminum chloride in the same manner, at a 3/1 Al/Ti molar ratio. The reaction product was a dark red brown liquid and a dark grey solid. (XXIB-2).

In an essentially identical manner, reaction product XXIA-2 (Ti/Mg/Ni molar ratio 1/1/0.34) was combined with iBuAlCl₂ at a 3:1 Al/Ti ratio, with the same results, except that the supernatant liquid was a pale red brown color. (XXIB-3).

In a further run, reaction product XXIA-2 was reacted in the same manner with iBuAlCl₂ at a 6:1 Al:Ti molar ratio, to for, similarly, a dark liquid and dark precipitate, (XXIB-4).

The same reaction product XXIA-2 was combined with ethyl aluminum chloride in the same manner, producing a dark red brown liquid and a dark grey solid. (XXIB-5).

EXAMPLE XXII

A. Example XXIA was repeated, with the reactants supplied in the molar ratio Ti:Mg:Ni of 1:0.65:0.11. The color change was from deep brown yellow to dark brown with gas evolution, and thence through a grey brown to dark blue black upon consumption of magnesium, in a reaction occurring over a period of 6 hours. (XXIIA).

B. Reaction product XXIIA was combined with ethyl aluminum chloride in the manner of Example XXIB at a 3:1 Al/Ti molar ratio. A red brown liquid and red brown precipitate was recovered. (XXIIB).

EXAMPLE XXIII

Example XXIIA was repeated, with the reactants supplied in the molar ratio 1/0.75/0.128. The dark brown reaction product contained 5.9% Ti, 2.2% Mg and 0.97% Ni.

The reaction product was then treated with isobutyl aluminum chloride at an Al/Ti molar ratio of 3/1.

EXAMPLE XXIV

A series of TMgNi catalysts, prepared as set forth in Examples XXIB and XXIIIB, were employed as catalyst components in the polymerization of ethylene (190° F., 10 mol % ethylene, triethyl aluminum about 45 ppm calc as Al, H₂ as indicated) with the results set forth in Table VI, as follows:

TABLE VI

| Catalyst | H₂ psig | Productivity g PE/g Ti Hr | Resin Properties | | |
|---|---|---|---|---|---|
| | | | MI | HLMI | HLMI/ML |
| XXIB-3 | 60 | 90,750 | 9.55 | 270 | 28 |
| | 120 | 104,980 | 24.6 | 683 | 27.8 |
| | 60 | 111,940 | 0.29 | 10.7 | 36.8 |
| | 120 | 112,260 | 3.1 | 119 | 38.9 |
| XXIB-4 | 60 | 59,790 | 0.25 | 10.9 | 43.6 |

TABLE VI-continued

| Catalyst | $H_2$ psig | Productivity g PE/g Ti Hr | MI | HLMI | HLMI/ML |
|---|---|---|---|---|---|
|  | 120 | 62,720 | 1.0 | 43.6 | 43.6 |
| XXIIB | 60 | 57,890 | 1.66 | 54.9 | 33.1 |
|  | 120 | 64,740 | 6.13 | 183 | 29.8 |
| XXIB-2 | 60 | 238,670 | 0.65 | 19.5 | 30.2 |
|  | 120 | 271,560 | 6.7 | 188 | 28.1 |
| XXIB-5 | 30[1] | 175,000 | Low | — | — |

[1] Runs at higher levels of hydrogen were extremely rapid, resulting in polymer buildup requiring termination of runs.

EXAMPLE XXV

A. TBT, Mg° and $MgSiF_6 \cdot 6H_2O$ were combined in octane in a heated reaction vessel equipped with reflux in the manner of the foregoing Examples, to provide reaction products at molar ratios of 1/1/0.34 and 1/0.75/0.128, respectively.

B. The latter reaction product was activated by reaction with ethyl aluminum chloride at a ratio of 3/1 Al/Ti.

C. The resulting brown precipitate was separated from the supernatant red brown liquid, and employed with TEA to provide about 45 ppm Al under standard conditions for polyethylene polymerization (190° F., 60 psig $H_2$) producing resin at 107,500 g PE/gTi/hr characterized by MI 2.85, HLMI 84.5 and MIR 29.6.

D. The 1/1/0.34 reaction product prepared above was likewise activated with isobutyl aluminum chloride at 3/1 Al/Ti. The solid reaction product was washed several times with hexane and employed with TEA in a polyethylene polymerization reactor preloaded with butene-1 to provide resin of targeted density at 170° F., 30 psi $H_2$ from the ethylene/butene-1 feed. The resulting resin had a density of 0.9193, MI 1.91, HLMI 60.8 and MIR 31.8.

In the following Example, catalyst components were activated by reaction with a halide component.

EXAMPLE XXVI

A. In the following runs, TMMg reaction products were reacted with the halide component added gradually thereto, usually dropwise to control the exothermic reaction. The reaction was conducted under ambient conditions for a period of time sufficient to complete addition with stirring of reactant, for 10 to 30 minutes after occurence of peak temperature (where applicable, TMMg solid and liquid components were intermixed into a slurry and employed in that form). Reactants and reactant proportions are set forth as follows:

| Catalyst Component, mol ratio Ti/Mg/$MgCl_2 \cdot 6H_2O$ ($H_2O$) | Halide Activator | Mol Ratio |
|---|---|---|
| 1/0.65/0.11(0.66) | $Bu^iAlCl_2$ | 2/1 Al/Ti |
| 1/0.65/0.11(0.66) | $Bu^iAlCl_2$ | 3/1 |
| 1/0.65/0.11(0.66) | $Bu^iAlCl_2$ | 4/1 |
| 1/0.65/0.11(0.66) | $Bu^iAlCl_2$ | 6/1 |
| 1/0.65/0.11(0.66) | $EtAlCl_2$ | 3/1 |
| 1/0.65/0.11(0.66) | $EtBCl_2$ | 1.25/1 (B/Ti) |
| 1/0.65/0.11(0.66) | $EtBCl_2$ | 3/1 (B/Ti) |
| 1/0.65/0.11(0.66) | $SiCl_4$ | 3/1 (Si/Ti) |
| 1/0.65/0.11(0.66) | $SiCl_4$ | 6/1 (Si/Ti) |
| 1/0.75/0.128(.768) | $EtAlCl_2$ | 3/1 |
| 1/0.75/0.128(.768) | $Et_3Al_2Cl_3$ | 3/1 |
| 1/0.75/0.128(.768) | $Bu^iAlCl_2$ | 3/1 |
| 1/0.75/0.128(.768) | $Bu^iAlCl_2$ | 6/1 |
| 1/0.75/0.128(.768) | $EtBCl_2$ | 3/1 (B/Ti) |
| 1/0.75/0.128(.768) | $(CH_3)_2SiCl_2$ | 6/1 (Si/Ti) |
| 1/0.75/0.128(.768) | $(CH_3)_3SiCl$ | 6/1 (Si/Ti) |
| 1/0.75/0.128(.768) | $(CH_3)_2SiHCl$ | 6/1 (Si/Ti) |
| 1/0.75/0.128(.768) | $SiCl_4$ | 3/1 (Si/Ti) |
| 1/0.75/0.128(.768) | $SiCl_4$ | 6/1 (Si/Ti) |
| 1/0.75/0.128(.768) | $TiCl_4$ | 1.5/1 (Ti/Ti) |
| 1/0.75/0.128(.768) | $TiCl_4$ | 3/1 (Ti/Ti) |
| 1/1/.17(1.02) | $Bu^iAlCl_2$ | 3/1 |
| 1/1/.17(1.02) | $EtAlCl_2$ | 3/1 |
| 1/1/.34(2.04) | $Bu^iAlCl_2$ | 3/1 |
| 1/1/.34(2.04) | $Bu^iAlCl_2$ | 6/1 |
| 1/1/0.51(3.06) | $Bu^iAlCl_2$ | 3/1 |
| 1/1/0.51(3.06) | $Bu^iAlCl_2$ | 6/1 |
| 2/1/0.17(1.02) | $Bu^iAlCl_2$ | 3/1 |
| 2/1/0,17(1.02) | $Bu^iAlCl_2$ | 6/1 |
| 2/1/0.34(2.04) | $Bu^iAlCl_2$ | 3/1 |
| 2/1/0.34(2.04) | $Bu^iAlCl_2$ | 6/1 |
| 3/1/0.51(3.06) | $Bu^iAlCl_2$ | 3/1 |
| 3/1/0.51(3.06) | $Bu^iAlCl_2$ | 6/1 |

EXAMPLE XXVII

A. Catalyst samples activated with $Bu^iAlCl_2$ (3:1 Al/Ti) were employed in a series of polymerization runs, with results set forth in Table VII as follows:

TABLE VII

| TMMg (molar ratio) | Ti/$MgCl_2 \cdot 6H_2O$ (molar ratio) | $H_2$ (psig) | Productivity (g PE/g Ti-hr.) | Resin Powder Properties | | |
|---|---|---|---|---|---|---|
| | | | | MI | HLMI | HLMI/MI |
| 1/1/0.17 | 5.9 | 60 | 42,870 | 1.7 | 61 | 35.9 |
|  |  | 120 | 49,102 | 12.2 | 348 | 28.5 |
| 1/1/0.34 | 2.9 | 60 | 63,385 | 3.8 | 135 | 35.5 |
|  |  | 120 | 43,655 | 15.7 | 519 | 33.0 |
| 2/1/0.34 | 5.9 | 60 | 57,510 | 2.5 | 81 | 32.3 |
|  |  | 120 | 54,200 | 12.5 | 452 | 36.2 |
| 3/1/0.51 | 5.9 | 60 | 53,975 | 2.4 | 89 | 37.1 |
|  |  | 120 | 56,560 | 13.2 | 430 | 32.6 |
| 1/0.75/0.128 | 7.8 | 60 | 124,930 | 5.3 | 179 | 33.8 |
|  |  | 120 | 116,990 | 22.8 | 630 | 27.6 |
| 1/0.65/0.11 | 9.1 | 60 | 76,785 | 8.1 | 245 | 30.2 |
|  |  | 120 | 61,550 | 44.5 | 1300 | — |
| ‧2/1/0.17 | 11.8 | 60 | 138,820 | 2.25 | 67.3 | 29.9 |
|  |  | 120 | 89,900 | 17.4 | 491 | 28.2 |

Reactor Conditions
Diluent — Isobutane
Temperature — 190° F.
Hydrogen — as indicated
Co—catalyst — triethylaluminum (45 ppm Al)
Catalyst — $Ti(OBu)_4$—Mg—$MgCl_2 \cdot 6H_2O$ reaction product activated with $Bu^iAlCl_2$ (3:1 Al/Ti)
Ethylene — 10 mol %
Run Time — 60 minutes As may be seen from a comparison of Ti/$MgCl_2 \cdot 6H_2O$ molar ratio, peak melt index is observed at a 9:1 ratio (1.5:1 Ti/$H_2O$).

B. In the following additional runs the effect of Al/Ti ratio in the activated TMMg (molar ratio 1/0.65/0.11) catalysts were explored in the polymerization of ethylene. Results are set forth in Table VIII as follows:

TABLE VIII

| Activating Compound | Activating Compound/Ti (molar) | $H_2$ (psig) | Productivity (g PE/g Ti-hr) | Resin Powder Properties | | |
|---|---|---|---|---|---|---|
| | | | | MI | HLMI | HLMI/MI |
| Bu$^i$AlCl$_2$ | 2/1 | 60 | 54,285 | 16.8 | 489 | 29.1 |
| | | 120 | 45,670 | 51 | 1436 | 28.2 |
| Bu$^i$AlCl$_2$ | 3/1 | 60 | 76,785 | 8.1 | 245 | 30.2 |
| | | 120 | 61,550 | 44.5 | — | — |
| Bu$^i$AlCl$_2$ | 4.5/1 | 60 | 66,410 | 7.7 | 257 | 33.4 |
| | | 120 | 67,255 | 35.5 | 1119 | 31.5 |
| Bu$^i$AlCl$_2$ | 6/1 | 60 | 43,830 | 2.7 | 105 | 39 |
| | | 120 | 44,370 | 15.0 | 495 | 33 |
| EtAlCl$_2$ | 3/1 | 60 | 60,790 | 7.0 | 214 | 30.6 |
| | | 120 | 97,310 | 39 | — | — |
| EtBI$_2$ | 3/1 | 60 | 94,755 | 3.7 | 128 | 34.6 |
| | | 120 | 56,290 | 21.5 | 616 | 28.6 |
| EtBCl$_2$ | 1.25/1 | 60 | 34,300 | 3.5 | 105 | 30 |
| | | 120 | 27,290 | 18 | 560 | 31 |

Reactor Conditions
Diluent — Isobutane
Temperature — 190° F.
Hydrogen — as indicated
Co-catalyst — triethylaluminum, (45 ppm Al)
Catalyst — Ti(OBu)$_2$—Mg—MgCl$_2$·6H$_2$O reaction product, activated as above.
Ethylene — 10 mole %
Run Time — 60 minutes C. In a further series of experiments, employing a TMMg catalyst at 1/0.75/0.128 molar ratio, the effect of activating agent was analyzed, with results set forth in Table IX as follows:

D. Larger scale polymerization runs were conducted at 160° F. with the TMMg 1/0.75/0.128 catalyst (slurry, separated from supernatant liquid, and washed with hexane) and TEA co-catalyst employing ethylene and butene-1 as a comonomer, utilizing varying butene-1 feed, activators and activator ratios. Results are set forth in Table X as follows:

TABLE IX

| Activation Agent | Mole Ratio Cl/Ti | $H_2$ (psig) | Productivity (g PE/g Ti-hr) | Resin Powder Properties | | |
|---|---|---|---|---|---|---|
| | | | | MI | HLMI | HLMI/MI |
| Bu$^i$AlCl$_2$ | 6 | 60 | 124,930 | 5.3 | 179 | 33.8 |
| | | 120 | 116,990 | 22.8 | 630 | 27.6 |
| EtBCl$_2$ | 6 | 60 | 94,850 | 3.2 | 103 | 32.2 |
| | | 120 | 80,060 | 29.0 | — | — |
| Me$_2$SiCl$_2$ | 12 | 60 | 24,860 | 2.44 | 58.5 | 24.0 |
| | | 120 | 21,120 | 10.4 | 259 | 24.9 |
| Me$_3$SiCl | 4 | 60 | 32,225 | 7.25 | 214 | 29.5 |
| | | 120 | 28,770 | 16.3 | 460 | 28.2 |
| Me$_2$SiHCl | 6 | 60 | 33,010 | 1.94 | 51.7 | 26.6 |
| | | 120 | 18,140 | 7.29 | 198 | 27.2 |
| SiCl$_4$ | 12 | 60 | 61,210 | 8.86 | 210 | 23.7 |
| | | 120 | 55,435 | 25.2 | 611 | 24.2 |
| SiCl$_4$ | 24 | 60 | 145,830 | 0.99 | 29.0 | 29.3 |
| | | 120 | 71,670 | 7.96 | 229 | 28.7 |
| TiCl$_4$ | 6 | 60 | 31,950 | 1.8 | 61.7 | 34.2 |
| | | 120 | 24,555 | 8.8 | 297 | 33.7 |

Reactor Conditions
Diluent — Isobutane
Temperature — 190° F.
Hydrogen — as indicated
Co-catalyst — triethylaluminum, (45 ppm Al)
Ethylene — 10 mole %
Run Time — 60 minutes

TABLE X

| Run No. | Ethylene Feed (Wgt. % monomer in reactor) | Butene-1 Feed (Wgt. % Total monomer) | $H_2$/Ethylene (mol ratio) | Pellet MI | HLMI/MI | Density Annealed | Activator |
|---|---|---|---|---|---|---|---|
| A | 4.41 | 7.55 | .12 | 12.7 | 1300 | 0.948 | 6/1 Al/Ti iBuAlCl$_2$ |
| B | 2.39 | 7.14 | .06 | 1.9 | 40 | 0.939 | 6/1 Al/Ti iBuAlCl$_2$ |
| C | 3.02 | 11.56 | .05 | 1.0 | 41.2 | 0.934 | 6/1 Al/Ti iBuAlCl$_2$ |
| D | 2.43 | 11.59 | .07 | 3.2 | 28.5 | 0.939 | 3/1 Al/Ti EADC |
| E | — | — | — | 3.9 | 28.6 | 0.934 | 3/1 Al/Ti EADC |
| F | — | — | — | 0.6 | 33.4 | 0.931 | 3/1 Al/Ti EADC |
| G | 2.32 | 14.66 | .03 | 0.7 | 30.2 | 0.929 | 3/1 Al/Ti EADC |
| H | 2.34 | 15.77 | .03 | 0.6 | 31.3 | 0.928 | 3/1 Al/Ti EADC |
| I | — | — | — | 5.8 | 29.7 | 0.935 | 3/1 Al/Ti EADC |
| J | 1.75 | 17.82 | .06 | 1.1 | 43.9 | 0.924 | 6/1 Al/Ti EADC |

The resin batches collected as noted above were stabilized with 100 ppm calcium stearate and 1000 ppm Irganox 1076; characterized by conventional tests; and converted into blown film in a 1½" Hartig extruder (60 rpm screw; 3" die at 0.082" die gap; cooling air 37°–40° F.) and further tested, all as set forth below in Tables XI and XII:

ene-1 was fed to the reactor as a comonomer with ethylene, and then butene-1 was substituted providing, as followed by off-gas analysis, ethylene/butene-1/hexene-1 copolymers and terpolymers in the course of the operation. Results are set forth in Table XIII, as follows:

TABLE XI

Linear Low Density Resins

Resin Properties

|  | A | B | C | D | E | F | G | H | I | J |
|---|---|---|---|---|---|---|---|---|---|---|
| Eta 1000 × $10^{-3}$ | 1.56 | 3.67 | 4.36MF | 3.56 | 3.35 | 3.95MF | 4.00MF[1] | 3.90MF[1] | 2.89 | 4.15 |
| Die Swell @ Eta 1000 | 146 | 164 | — | 152 | 150 | — | — | — | 146 | 165 |
| Tensile Strength, psi @ 20"/min | 3960 | 1790 | 1850 | 1810 | 1700 | 2250 | 3420 | 3310 | 1660 | 1910 |
| Yield Strength, psi @ 20"/min | — | 3210 | 2770 | 3220 | 2830 | 2670 | 2480 | 2400 | 2910 | 2050 |
| Elongation, % @ 20"/min | 100 | 130 | 680 | 160 | 290 | 740 | 750 | 740 | 100 | 810 |
| Tensile Modulus, psi × $10^3$ | 66.3 | 52.0 | 42.2 | 49.1 | 39.0 | 39.5 | 33.8 | 34.8 | 44.3 | 27.7 |
| Tensile Impact, ft-lb/in$^2$ | 47.7 | 94.6 | 130 | 88.3 | 79.2 | 213.7 | 267.4 | 299.0 | 96.6 | 181.9 |
| Vicat, °C. | 115 | 115 | 114 | 115 | 114 | 112 | 112 | 110 | 109 | 100 |
| LTB, °C. | −76 | −76 | −76 | −76 | −76 | −76 | −76 | −76 | −76 | −76 |
| Shore Hardness, "D" | 61 | 58 | 57 | 59 | 58 | 57 | 57 | 56 | 58 | 52 |

[1]MF = at least some melt fracture, indicating need for optimization of conditions for actual extrusion.

TABLE XII

Linear Low Density Resins Blown Film Properties

|  |  | B | | C | | F |
|---|---|---|---|---|---|---|
| Film Thickness, mils |  | 2.0 | 1.0 | 2.0 | 1.0 | 2.0 |
| Haze, % |  | 45.5 | 30.0 | 28.4 | 32.2 | 18.3 |
| Gloss, 60°, % |  | 3.3 | 4.4 | 4.9 | 3.9 | 7.1 |
| Tensile Strength, psi | MD | 3740 | 4130 | 5620 | 6060 | 5500 |
|  | TD | 2940 | 2070 | 3320 | 4410 | 4900 |
| Yield Strength, psi | MD | 2610 | 2550 | 2390 | 2250 | 2180 |
|  | TD | 2840 | 2400 | 2620 | 2330 | 2410 |
| Elongation, % | MD | 750 | 560 | 670 | 670 | 700 |
|  | TD | 830 | 320 | 780 | 880 | 550 |
| Elmendorf Tear, g/mil | MD | 16 | 6 | 21 | 21 | 35 |
|  | TD | 17 | 346 | 177 | 492 | 256 |
| Tear ASTM D1004. lb/mil | MD | 1.07 | 1.12 | 0.94 | 0.74 | 0.99 |
|  | TD | 0.97 | 0.97 | 0.94 | 0.82 | 0.96 |
| Tensile Modulus, psi | MD | 72350 | 68440 | 60130 | 55250 | 49830 |
|  | TD | 92930 | 87910 | 74340 | 67800 | 68520 |
| Dart Drop, gms (mils) |  | 72(2.2) | 10.5(1.0) | 92(2.2) | 45(1.3) | 81(2.0) |
| Dynamic Ball Burst cm-kg (mils) |  | 2.44 | 1.40(1.0) | 3.94(2.2) | 2.48(1.2) | 4.26(2.0) |
| Draw down mils |  | — | 0.25 | — | 0.2 | — |
| Melt Temp., °F. |  | 331 | 330 | 359 | 359 | 405 |
| Head Pressure, psig |  | 3400 | 3400 | 3850 | 3850 | 4450 |
| Cooling Air Temp., °F. |  | 38 | 38 | 39 | 39 | 38 |

|  | G | | H | | J | |
|---|---|---|---|---|---|---|
| Film Thickness, mils | 2.0 | 1.0 | 2.0 | 1.0 | 2.0 | 1.0 |
| Haze, % | 24.4 | 22.6 | 24.4 | 18.9 | 24.5 | 20.0 |
| Gloss, 60°, % | 5.6 | 5.6 | 5.6 | 6.1 | 6.0 | 6.0 |
| Tensile Strength, psi | 5710 | 6930 | 5710 | 7700 | 4340 | 6180 |
|  | 5250 | 5290 | 5250 | 5010 | 3290 | 3610 |
| Yield Strength, psi | 1960 | 1960 | 1960 | 2010 | 2070 | 1930 |
|  | 2210 | 2090 | 2210 | 2020 | 1840 | 1640 |
| Elongation, % | 680 | 590 | 680 | 520 | 670 | 610 |
|  | 850 | 830 | 850 | 810 | 830 | 860 |
| Elmendorf Tear, g/mil | 80 | 53 | 80 | 32 | 80 | 99 |
|  | 277 | 429 | 277 | 559 | 366 | 503 |
| Tear ASTM D1004, lb/mil | 1.03 | 0.98 | 1.03 | 1.25 | 0.83 | 0.86 |
|  | 0.95 | 1.21 | 0.95 | 1.14 | 0.80 | 0.80 |
| Tensile Modulus, psi | 46200 | 46585 | 46200 | 42940 | 37450 | 35360 |
|  | 56590 | 54880 | 56590 | 50343 | 44770 | 48370 |
| Dart Drop, gms (mils) | 109(2.1) | 38(1.0) | 109(2.1) | 36(1.0) | 85(2.5) | 43(1.2) |
| Dynamic Ball Burst cm-kg (mils) | 6.50(2.3) | 3.11(1.0) | 6.50(2.3) | 3.14(1.0) | 6.62(2.4) | 3.62(1.2) |
| Drawdown, mils | — | 0.3 | — | — | — | 0.3 |
| Melt Temp., °F. | 405 | 405 | 406 | 405 | 360 | 360 |
| Head Pressure | 4500 | 4500 | 4800 | 4800 | 3900 | 3900 |
| Cooling Air Temp. °F. | 38 | 38 | 37 | 37 | 40 | 40 |

E. In further large scale polymerizations conducted in a similar manner employing TMMg catalyst (slurry, separated from supernatant liquid and hexane washed) at molar ratio 1/0.75/0.128 (3/1 Al/Ti, EADC), hex-

TABLE XIII

| Comonomer | Density | MI | HLMI | HLMI/MI |
|---|---|---|---|---|
| Hexene | 0.9339 | 0.83 | 26.9 | 32 |

TABLE XIII-continued

| Comonomer | Density | MI | HLMI | HLMI/MI |
|---|---|---|---|---|
| " | 0.9293 | 0.73 | 23.9 | 33 |
| Hexene/Butene | 0.9157 | 0.94 | 31.4 | 33 |
| Butene | 0.9148 | 0.70 | 25.2 | 36 |
| " | 0.9148 | 0.70 | 25.2 | 36 |
| " | 0.9135 | 0.94 | 29.9 | 32 |

EXAMPLE XXVIII

TMMg catalyst prepared in accordance with the Examples and activated with isobutyl aluminum chloride (3/1 Al/Ti) was also employed to produce other copolymers at varying comonomer preload, isobutane diluent, 170° F. reactor temperature, 30–40 psig $H_2$ and TEA to provide 60 ppm Al, with results as follows:

| | MI | MIR | Density |
|---|---|---|---|
| Ethylene/3-Methylbutene-1 | 1.25 | 27.4 | 0.9488 |
| | 1.25 | 28.9 | 0.9483 |
| | 1.36 | 27.9 | 0.9507 |
| | 1.55 | 27.7 | 0.9497 |
| | 1.56 | 27.5 | 0.9495 |
| | 1.87 | 29.9 | 0.9496 |
| | 1.63 | 28.5 | 0.9455 |
| | 2.25 | 28.8 | 0.9437 |
| | 1.46 | 30.0 | 0.9428 |
| | 5.01 | 30.3 | 0.9411 |
| | 1.59 | 31.9 | 0.9400 |
| Isobutylene | 0.37 | 32.4 | 0.9518 |
| | 1.35 | 29.6 | 0.9564 |
| | 1.79 | 31.1 | 0.9542 |
| | 1.17 | 31.7 | 0.9567 |
| | 4.20 | 30.1 | 0.9582 |
| | 3.30 | 32.9 | 0.9557 |

Polymerization or copolymerization of other alpha olefin monomers such as propylene, 4-methyl pentene-1, the alkyl acrylates and methacrylates and alkyl esters may be accomplished in similar manner.

The following comparative experiments were also conducted:

COMPARATIVE EXAMPLES

A. In the same reaction vessel used in other preparations TBT, Mg° and anhydrous $MgCl_2$ were combined in octane at a molar ratio of 2/1/0.34 and heated to reflux for 15 minutes without evidence of reaction. The anhydrous $MgCl_2$ remained undissolved. See also Example IB above.

B. To the same system, an amount of free water equivalent to an Mg°/$MgCl_2.6H_2O$ ratio of 1/0.34 was added in bulk, but no change was evident.

C. TBT and Mg° were combined in a 2/1 molar ratio in octane and heated to reflux. While the yellow color became somewhat more intense, no evidence of reaction occurred.

D. To the system C above, an amount of free water equivalent to an Mg/$MgCl_2.6H_2O$ ratio of 1/0.34 was added. A small amount of light yellow precipitate was formed evidencing hydrolysis of the titanium compound, but the magnesium remained unreacted.

E. TBT and $MgCl_2.6H_2O$ were combined in octane at a molar ratio of 1/0.34 and heated to reflux. After the salt had entirely dissolved, the solution became cloudy and somewhat viscous with continued refluxing for three hours but cleared and settled to a cloudy yellow liquid and whitish precipitate overnight. A further run at molar ratio 1/0.128 developed a clear golden yellow liquid with heating to reflux over only 16 minutes. At a molar ratio of 1/1.17 foaming and formation of a thick cream colored gel terminated reaction after 45 minutes. Compare Example VII, above.

What is claimed is:

1. An intermetallic compound comprising the reaction product of a polymeric transition metal oxide alkoxide with a reducing metal having a higher oxidation potential than the transition metal, said polymeric transition metal oxide alkoxide being the product of the controlled partial hydrolysis of a transition metal alkoxide.

2. The intermetallic compound of claim 1, wherein the transition metal is titanium or zirconium.

3. The intermetallic compound of claim 2, wherein the reducing metal is magnesium.

4. The intermetallic compound of claim 3, wherein said titanium and said magnesium are present in a molar ratio of from about 0.5:1 to 3:1.

5. The intermetallic compound of claim 1, further reacted with a halide activator selected from the group consisting of alkyl aluminum halides, silicon halides, alkyl silicon halides, titanium halides, boron halides and alkyl boron halides.

6. The intermetallic compound comprising metal values composed predominantly of titanium and magnesium, obtainable by the reaction of a titanium alkoxide and magnesium metal in the presence of a controlled source of water, the molar ratio of titanium to water being from about 1:0.1 to 1:1, said reaction being conducted in an enclosed reaction zone at an elevated temperature under autogeneous pressure for a period of time sufficient to consume the magnesium metal.

7. The intermetallic compound of claim 6, wherein said compound is hydrocarbon soluble.

8. The intermetallic compound of claim 6, wherein said water is supplied by a hydrated metal salt.

9. The intermetallic compound of claim 6, wherein said titanium alkoxide is titanium tetra n-butoxide.

10. A catalyst component for the polymerization of alpha olefins comprising the intermetallic compound of any of claims 1-3, and 6 further reacted with a halide activator selected from the group consisting of an alkyl aluminum halide, a silicon halide, an alkyl silicon halide, a titanium halide, a boron halide, and an alkyl boron halide.

11. The catalyst component of claim 10, wherein the molar ratio of said halide activator to said intermetallic compound is between about 2.5/1 to 6/1, as Al/Ti, Si/Ti, Ti/Ti or B/Ti.

12. A catalyst system for the polymerization of alpha olefins comprising the catalyst component of claim 10 and an organo aluminum compound.

13. The catalyst system of claim 12, wherein said organo aluminum compound is triethyl aluminum.

14. A catalyst system for the polymerization of alpha olefins comprising the catalyst component of claim 10 and an organo boron compound.

15. The catalyst system of claim 14, wherein said organo boron compound is triethyl borane.

16. A process for the preparation of an intermetallic compound which comprises reacting a transition metal oxide alkoxide with a reducing metal of higher oxidation potential than the transition metal in the presence of a controlled source of water.

17. A process according to claim 16, wherein water is provided in the form of a hydrated metal salt.

18. A process according to claim 16 wherein said transition metal is titanium or zirconium.

19. A process according to claim 23, wherein the reducing metal is magnesium.

20. A process according to any of claim 16 and 23-24, wherein the product is further reacted with a halide activator.

21. An intermetallic compound comprising the reaction product of an at least partially reduced polymeric transition metal oxide alkoxide and a halide activator selected from the group consisting of alkyl aluminum halides, silicon halides, alkyl silicon halides, titanium halides, boron halides and alkyl boron halides.

22. The intermetallic compound of claim 21, wherein the transition metal is titanium or zirconium.

23. A method of producing a catalyst component for olefin polymerization comprising reacting a polymeric transition metal oxide alkoxide with a reducing metal of higher oxidation potential than the transition metal and thereafter reacting the at least partially reduced reaction product with a halide activator.

24. The method of claim 23, wherein said halide activator is selected from the group consisting of alkyl aluminum halides, silicon halides, alkyl silicon halides, titanium halides, boron halides and alkyl boron halides.

25. A catalyst component for olefin polymerization comprising the product of the method of claim 24.

26. An intermetallic compound comprising the reaction product of a polymeric transition metal oxide alkoxide with a reducing metal having a higher oxidation potential than the transition metal, further reacted with a silicon halide or alkyl silicon halide.

27. An intermetallic compound comprising the reaction product of a polymeric transition metal oxide alkoxide with a reducing metal having a higher oxidation potential than the transition metal, further reacted with a boron halide or an alkyl boron halide.

28. An intermetallic compound comprising the reaction product of a polymeric transition metal oxide alkoxide with a reducing metal having a higher oxidation potential than the transition metal, further reacted with a titanium halide.

29. An intermetallic compound comprising the product of the reaction of a polymeric transition metal oxide alkoxide with a reducing metal having a higher oxidation potential than the transition metal, and a hydrated metal salt.

30. The intermetallic compound of claim 29, wherein the metal of said hydrated metal salt is selected from the group consisting of sodium, potassium, calcium, aluminum, nickel, cobalt, chromium and magnesium.

31. An intermetallic compound comprising the reaction product of a polymeric transition metal oxide alkoxide with aluminum.

32. An intermetallic compound comprising the reaction product of a polymeric transition metal oxide alkoxide with zinc.

* * * * *